United States Patent [19]

Edwards

[11] Patent Number: 4,805,990
[45] Date of Patent: Feb. 21, 1989

[54] APPARATUS FOR VIEWING A REFRACTED IMAGE AND PHOTOGRAPHIC METHOD

[76] Inventor: Clarence C. Edwards, 4256 E. Capitol St., NE., Washington, D.C. 20019

[21] Appl. No.: 10,767

[22] Filed: Feb. 4, 1987

[51] Int. Cl.⁴ .......................... G02B 5/04; G01J 3/14; G01J 3/46; G01J 3/51
[52] U.S. Cl. .................................... 350/168; 350/286; 350/315; 356/302; 356/404; 356/419
[58] Field of Search ...................... 350/168, 31 S, 286; 351/56, 155; 356/302, 404, 416, 419, 425

[56] References Cited

U.S. PATENT DOCUMENTS

| | | |
|---|---|---|
| 599,670 | 2/1898 | Harrison . |
| 649,421 | 5/1900 | Townsend ............................. 351/155 |
| 1,030,143 | 6/1912 | Tusten .................................... 351/56 |
| 1,872,501 | 8/1932 | Rehländer ............................ 350/413 |
| 2,123,682 | 7/1938 | Wingate ..................................... 88/47 |
| 2,179,657 | 11/1939 | Estey ..................................... 356/302 |
| 2,218,253 | 10/1940 | Weaver ................................. 356/404 |
| 2,444,512 | 7/1948 | Kath ....................................... 95/81.5 |
| 2,594,698 | 4/1952 | Thomas ................................ 350/168 |
| 2,927,500 | 3/1960 | Belanger et al. ..................... 356/404 |
| 3,468,599 | 9/1969 | Jordan .................................. 350/146 |
| 3,475,079 | 10/1969 | Stricker ................................ 350/168 |
| 3,554,647 | 1/1971 | Paine .................................... 356/302 |
| 3,603,672 | 9/1971 | Bastide ................................. 350/315 |
| 3,752,591 | 8/1973 | Feldman .............................. 356/247 |
| 4,389,118 | 6/1983 | Yuasa et al. ......................... 356/404 |

*Primary Examiner*—Bruce Y. Arnold
*Assistant Examiner*—Terry S. Callaghan
*Attorney, Agent, or Firm*—Irvin A. Lavine

[57] ABSTRACT

A hand-held prism and support structure, in which a positioning element is engageable with the head of a viewer for orientation and manipulation to position the prism as to enable the viewer to receive refracted light from a scene which is in advance of the viewer. The prism has an upper face and a pair of depending and converging faces, the positioning element being engageable with the nose of the viewer. A filter strip comprising different color filters is provided in advance of the prism and one eye of the viewer, there being a prism without a filter in advance of the other eye.

A method of color photography includes viewing a refracted and, optionally, color-filtered image of a scene, and photographing the scene using color sensitive film and, optionally, a color filter.

25 Claims, 2 Drawing Sheets

APPARATUS FOR VIEWING A REFRACTED IMAGE AND PHOTOGRAPHIC METHOD

BACKGROUND OF THE INVENTION

The present invention relates to apparatus including a prism or prisms for viewing a scene, and to a method of color photography using such apparatus.

It has long been recognized that a prism may be used to demonstrate the color components of light by dispersing the light. The dispersion of a beam of sunlight is a familiar demonstration to beginning students of optical physics. Various apparatus have been provided for using prisms for other purposes, in addition to demonstration of light dispersion.

Jordan, U.S. Pat. No. 3,468,599, provides a viewing apparatus comprising a pair of prisms, intended for viewing black and white television. Light passing through and dispersed by the prisms enters the eyes of the viewer, to provide some coloration of the image. The apparatus comprises an elongated box, having a pair of chambers, in each of which is a right-angle prism, having an objective face and an ocular face, these faces diverging downwardly. A color filter is placed over part of the objective face of the prisms to provide a "soft rose color", the filter being smaller than the objective face to permit the passage of some light through the prisms without passage through the filter. The viewer is required to tilt the apparatus at an angle to the horizontal, and to look upwardly, in order to view a television screen which is generally directly in front of the viewer.

Stricker, U.S. Pat. No. 3,475,079, provides a viewer mounted on a post and which contains a prism within a housing, the housing having appertures located on opposite sides. A scene may be viewed through the prism, with change in the appearance due to chromatic aberration caused by the prism.

Wingate, U.S. Pat. No. 2,123,682, provides an attachment for a pair of glasses which includes a prism in advance of each of the lenses. The purpose is to enable a person to lie on his back and to view a scene horizontally, caused by internal reflection within the prism.

Color photography is widely used, not only for aesthetics, but for instructional and scientific purposes. From the point of view of aesthetics, photographers have used color films of different characteristics and, optionally, have used color filters in order to achieve desired artistic effects of the photographs which are produced. In the instructional and scientific fields, color photography is used in order to provide enhanced information from the scenes or objects photographed. In both fields of endeavor, the photographer uses his knowledge, obtained through education and experience, to select the particular films and filters which he judges will be those which will best produce the desired results. In doing this work, the photographers often use color filters both to view the scene prior to making the photograph on the color-sensitive film and to filter the light from the scene or object before it reaches the color sensitive film.

The above methods, while producing aesthetic and artistically appealing photographs and informative instructional and scientific photographic reproductions, do not fully achieve their goals due to the fact that it is not possible, when viewing unrefracted light, to gain all possible information about the composition of the light from the scene or object, and particularly the dominant colors thereof.

SUMMARY OF THE INVENTION

An apparatus is provided for viewing a scene through a prism, the prism being supported so that the viewer may receive a spectrally dispersed image of a scene. The prism is provided with objective and ocular faces which converge downwardly, and is supported by a planar positioning element which extends downwardly from the prism, preferably being in the median plane between the objective and ocular faces of the prism. By holding the planar positioning element substantially vertically and against one's nose, and with the prism in front of the eyes, the scene directly in front may be viewed, with dispersion of the light from it by the prism; adjustment to readily receive the image may be effected by slight movement of the device about a horizontal axis at the juncture of the nose and positioning element.

In another embodiment of the apparatus, a pair of prisms as above described are provided, one in advance of each of the eyes of a viewer, and a filter in the form of a strip of individual filter elements of different colors is provided in advance of the objective face of one of the prisms, the filter strip preferably being mounted on a pair of reels, one above the prism and the other below the planar positioning element. Any color filter may be quickly placed in front of the prism.

A color photography method is provided in which a scene or object to be photographed is first viewed through an apparatus which will disperse the light from the scene or object, so that the viewer may thereby determine the dominant color or colors of the scene or object. Optionally, the scene may be viewed through not only dispersing apparatus, but additionally, a color filter or filters, so as to determine the effect of one or another color filter on the received dispersed image. The color photograph may then be made through a color filter, or without a color filter.

Among the objects of the present invention are the provision of an apparatus for viewing a dispersed image of a scene which is readily usable so as to enable a scene to be viewed with dispersed light. Another object is the provision of a hand held apparatus to enable the viewing of a dispersed image of a scene which facilitates manipulation to bring the scene into view. Still another object is to provide an apparatus for viewing a dispersed image of a scene having in association with it a multiplicity of color filter elements which may be selectively placed in position over a prism; yet another object is to provide such an apparatus in which another prism is provided without a color filter, so that the same scene may be viewed, by alternate use of the eyes of a viewer, either dispersed, or dispersed refracted and selectively filtered.

A still further object of the present invention is the provision of an improved method of color photography enabling the obtaining of enhanced color photographs.

Other objects and the attendant advantages of the present invention will be readily understood from consideration of the following specification, claims and the appended drawings.

DESCRIPTION OF THE PREFERRED EMBODIMENTS

Figure 1:
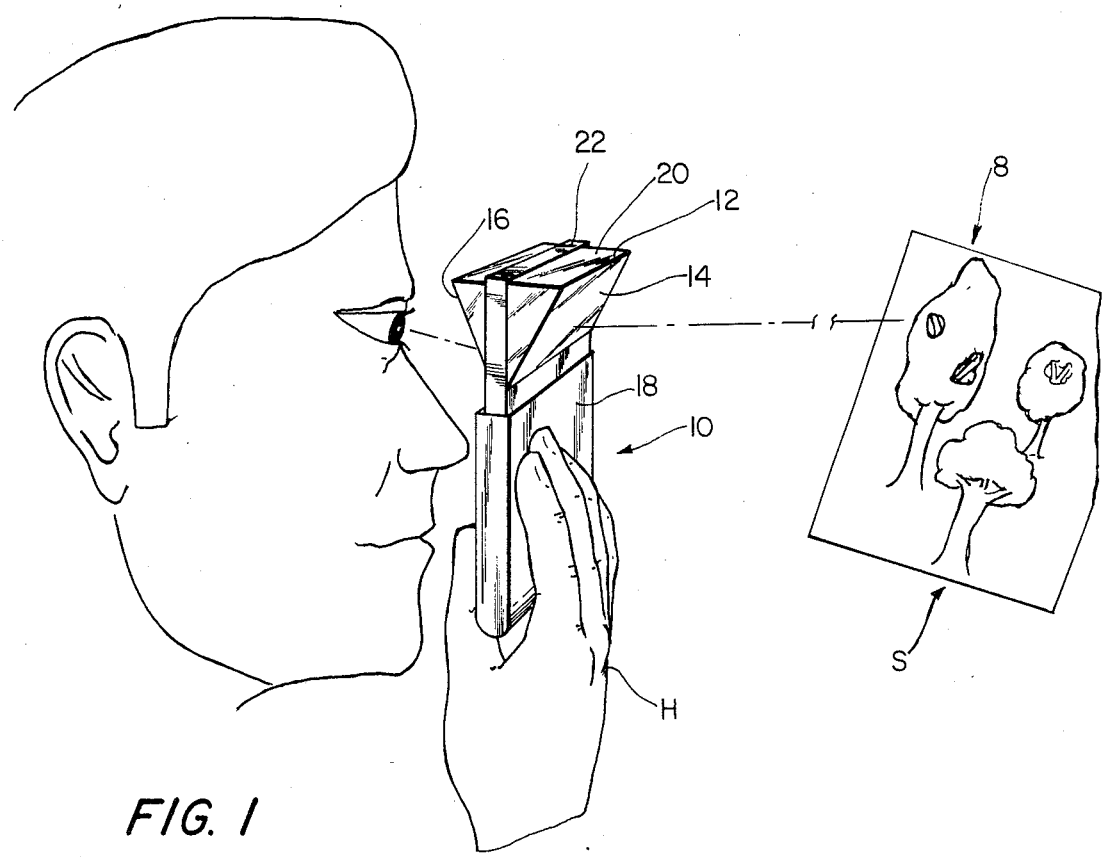
FIG. 1 is a perspective view showing an apparatus for viewing a dispersed image in accordance with the present invention, and showing the manner of use.

Referring now to the drawings, wherein like or corresponding reference numerals are used to designate like or corresponding parts throughout the several views, there is shown in FIG. 1 a viewing apparatus generally designated 10, and comprising a prism 12. Prism 12 is generally horizontally extending, having an objective face 14 directed generally towards the scene S to be viewed, and an ocular face 16, which is the face of prism 12 which is closest to the eye E of a person P using the apparatus 10. The objective face 14 and ocular face 16 of prism 12 converge downwardly and form an edge (not shown) that extends transversely of the prism 12. The prism forms an equilateral triangle, and the third face 20 is approximately horizontal in use. The prism may be of good quality optical glass, or other material in which internal scattering is minimal.

Figure 2:
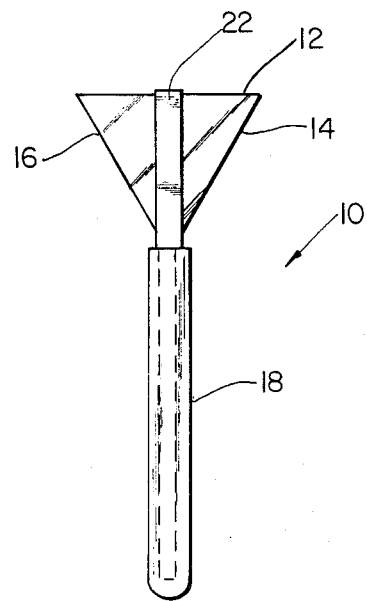
FIG. 2 is a side elevational view of the apparatus shown in FIG. 1.

A planar positioning element 18 is provided, and as is shown in FIG. 2, the median plane of positioning element 18 is substantially in alignment with the median plane of prism 12 between the object face 14 and ocular face 16. A strap 22 extends across the face 20 of the prism 12 and thence downwardly to the positioning element 18, to which it is joined.

Referring again to FIG. 1, the apparatus 10 may be held in the hand in the person P and readily brought into position, with the prism 12 in general alignment with the eyes E of the person. To establish the prism 12 in the proper orientation relative to the eyes E, the positioning element 10 is brought to rest on the nose of the person P with the face 20 approxiamtely horizontal. This places the prism 12 approximately in proper position for viewing of the scene S which is generally directly ahead of the person P. The person P casts his eyes somewhat downwardly to look at the scene S in front of him. By slight manipulation of the apparatus 10 by rotating it around the end of the nose on a horizontal axis or axes, the precise scene or portion of the scene of interest may be viewed through the prism 12.

The prism 12 will refract the light, and there will be provided to the person P a dispersed image having spectral distribution in which certain colors are dominant. Thus, the person P will be made aware that the scene (or principal object) has certain strong color characteristics of, for example, yellow and green, or red and yellow, etc.

Following the viewing of the scene or object through the prism 12, the scene or object is photographed, using color sensitive film. The photography is done under substantially the same conditions as the viewing; if outdoors, the photographs are made before the light changes significantly. With the knowledge gained of the dominant color or colors in the scene or object from viewing the refracted image A, the photographer may select a desired color filter in order either to enhance a dominant color or colors, or to diminish the dominant color or colors. Through use of this method, the resulting color photograph has artistic effects and/or enhancement or diminishing of certain color components which serve to enhance the aesthetic appearance of the resulting photograph and/or provide an enhanced color photograph for instructional or scientific purposes.

Figure 3:
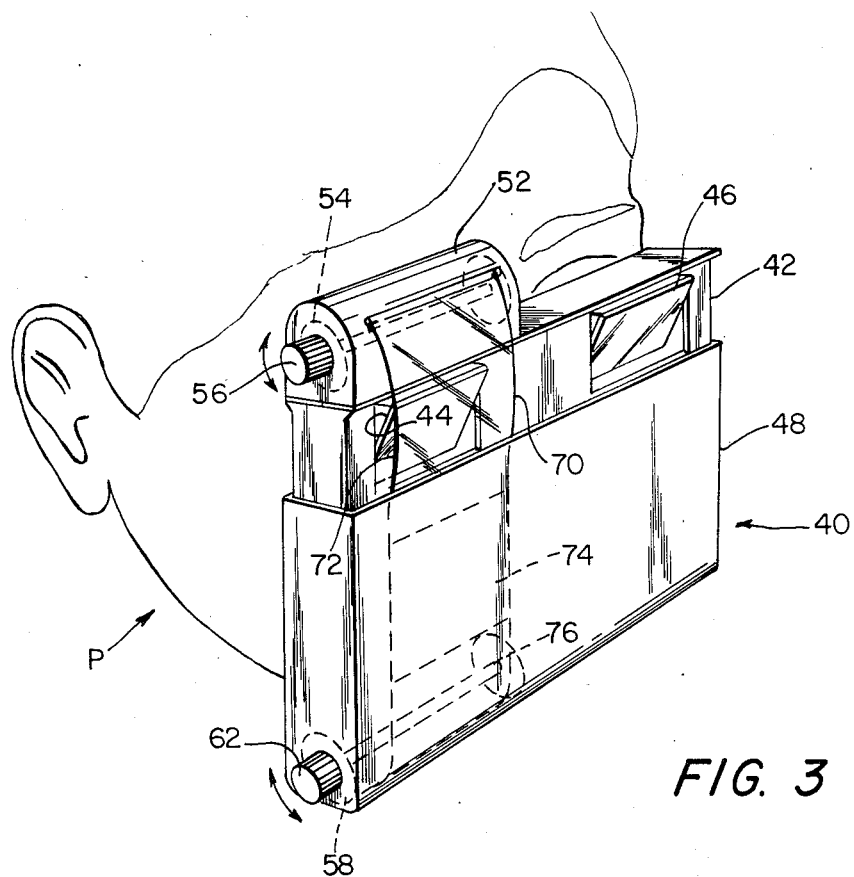
FIG. 3 is a view similar to FIG. 1 showing an alternate embodiment of the invention in use.

Referring now to FIG. 3, there is shown a viewing apparatus 40 which includes a housing 42 containing a pair of spaced prisms 44 and 46 positioned in openings which extend transversely through the supporting housing 42. The prisms 44 and 46 are positioned as is the prism 12, having objective and ocular faces which converge downwardly. A positioning element 48 is secured to the supporting housing 42 and, like positioning element 18, is generally planar, having a small thickness compared to its breadth and height.

Mounted on or forming a part of housing 42 is a container 52 for a spool 54 rotatably housed within it; a turning knob 56 extends outwardly from the container 52. A second spool 58 is rotatably carried beneath prism 44, preferably within positioning element 48, and a turning knob 62 extends out of positioning element 48 for rotating the spool 58. The positioning element 48 is provided with a passage within it, extending upwardly to the housing 42 from the spool 58.

Figure 4:
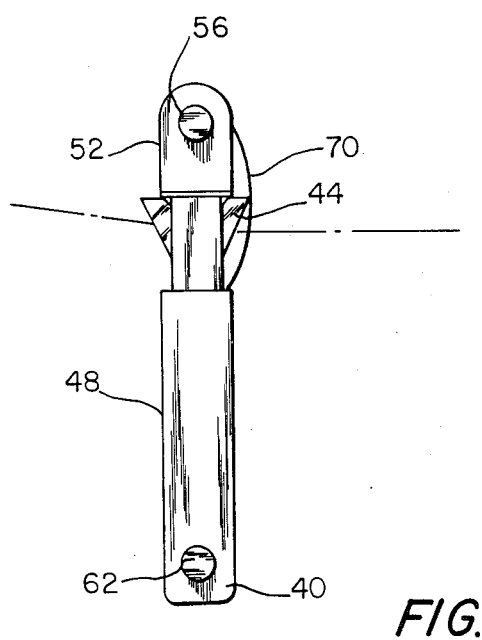
FIG. 4 is a side elevational view of the apparatus shown in FIG. 3.

A color filter strip 70 is secured on the spools 54 and 58, extending, as shown in FIG. 4, in advance of the objective face of prism 44 as shown in FIG. 3. The color strip 70 is made up of a plurality of serially related color segments or sections, sections 72, 74 and 76 being visible; each section is of a different color. By manipulation of the knobs 56 and 62, the strip 70 may be caused to move in front of the prism 44 from one spool to the other to position a selected color section in advance of prism 44.

In this manner, the right eye of the person P will be able to receive light which has been filtered through a selected color filter and the light from the selected color filter will then be dispersed by the prism 44 to provide spectral distribution. The person may view the scenes alternately through his left and right eyes, so as to receive either an image which is both filtered and refracted or an image which is refracted only.

The prisms 42 and 44 are optically like prism 12; the positioning of the apparatus 40 is effected as is the apparatus 10.

Following the viewing of a scene or object with the apparatus 40, and with the viewing of the scene or object alternately through the left and right eyes, and with viewing the scene or object through different color filters, the photographer is able to obtain additional information regarding the light composition of the scene or object. He will then proceed with photographing the scene or object using color film and possibly one or more selected color filters, generally as above described.

There have been provided viewing apparatus for dispersing a scene which may be readily brought into position for observation of a scene or object, in order to determine such color factors as the principal colors of the scene or object. In addition, there has been provided a readily usable dispersing viewing apparatus which may, in addition, have a strip of filters of multiple colors so that only a refracted image may be seen or an image which is both filtered and refracted.

There has also been provided a method of color photography in which the viewing of a scene or object is effected through an apparatus which will disperse the scene and, optionally, through an apparatus which will both disperse the scene and filter a color or colors from the light from the scene or object. After thus viewing the scene or object, the photographer will use color film, with or without color filter, in order to provide color photographs.

It will be obvious to one skilled in the art that various changes may be made without departure from the spirit of the invention, and therefore the invention is not limited to that shown in the drawings, and described in the specification, but only as indicated in the appended claims.

I claim:

1. Apparatus for viewing a refracted image of a scene comprising:
    (a) light dispersing means comprising at least one prism having an objective face and an ocular face angularly related,
    (b) a support for said prism, and
    (c) positioning means connected with said support for contacting only a part of the head of a viewer substantially spaced from the eye region for enabling said apparatus to be held by the hand of the viewer for positioning said prism with said faces converging downwardly and the ocular face in position to transmit refracted light of a scene to the eye of the viewer and for moving said prism relative to the eye of the viewer while said positioning means is in contact with the said part of the head of the viewer.

2. The apparatus of claim 1, wherein said positioning means comprises a positioning element extending below said prism.

3. The apparatus of claim 2, wherein said element has generally planar sides.

4. The apparatus of claim 3, wherein said element has a median plane substantially coplanar with the median plane between said faces of said prism.

5. The apparatus of claim 1, wherein said prism is a substantially equilateral triangle in cross-section.

6. The apparatus of claim 1, and in combination therewith, a color filter in the light path ahead of said prism.

7. The apparatus of claim 6, wherein said color filter is adjacent said prism and extends laterally only enough to filter light reaching one eye of a viewer.

8. The apparatus of claim 7, wherein said prism extends laterally of said filter and in front of the other eye of the viewer.

9. The apparatus of claim 6, wherein said color filter comprises a strip of different color filter elements, each of a size to substantially cover a said face of said prism.

10. The apparatus of claim 9, further comprising winding means for carrying said strip.

11. The apparatus of claim 10, wherein said winding means comprises first and second spools, means supporting said first spool above said prism, and means for supporting said second spool below said prism.

12. The apparatus of claim 6, wherein said color filter comprises a strip of different color filter elements, each of a size to substantially cover a said face of said prism.

13. Light reflecting apparatus comprising a prism having ocular and objective faces converging towards an edge, a laterally extending element having two planar sides, means for connecting said prism and said element having said element below said edge of said prism, the base of said prism extending transversely along said element, said element extending below said prism a distance at least sufficient to contact the nose of a viewer when the prism is in front of an eye of a viewer.

14. The apparatus of claim 13, wherein said prism extends laterally a sufficient distance to enable it to be placed before both eyes of a viewer.

15. The apparatus of claim 14, wherein said connecting means comprises a strap extending over said prism.

16. The apparatus of claim 13, further comprising a color filter in the light path ahead of said prism.

17. The apparatus of claim 16, further comprising a second prism laterally located from the first mentioned prism, said color filter being in the light path of only said first mentioned prism.

18. The apparatus of claim 16, wherein said color filter comprises a strip of different color filters.

19. Apparatus for viewing a refracted image of a scene comprising:
    (a) a light-dispersing prism having an objective face and an ocular face angularly related,
    (b) a support for said prism,
    (c) positioning means connected with said support for contacting a part of a human head for positioning said prism with said faces converging downwardly and the ocular face in position to transmit dispersed light of a scene to the eye of a viewer,
    (d) a color filter, and
    (e) means for supporting said color filter in the light path extending from the scene through said prism.

20. The apparatus of claim 19, wherein said color filter is adjacent said prism and extends laterally only enough to filter light reaching one eye of a viewer.

21. The apparatus of claim 20, wherein said prism extends laterally of said filter and in front of the other eye of the viewer.

22. A method of color photography comprising:
    causing the light from a scene or object to be spectrally distributed to thereby provide a dispersed image of the scene or object,
    viewing said dispersed image and observing the principal color or colors thereof,
    providing a camera having color sensitive film,
    providing a plurality of color filters, and
    photographing the scene or object viewed with said camera and color sensitive film and with or without placement of a selected color filter in the light path ahead of said film;
    wherein the selection and use of said color filter is based on said observed principal color or colors of said dispersed image.

23. The method of color photography as set forth in claim 22, and further comprising placing a selected color filter in the light path ahead of said film prior to said photographing of the scene or object and photographing said scene or object through said color filter with said camera and color sensitive film.

24. The method of color photography as set forth in claim 23, and further comprising viewing the scene or object additionally through a color filter and a prism before photographing said scene or object.

25. The method of color photography as set forth in claim 22, and further comprising viewing the scene or object additionally through a color filter and a prism before photographing said scene or object.

* * * * *